No. 812,887. PATENTED FEB. 20, 1906.
O. Q. SELLERS.
LUBRICATING WHEEL.
APPLICATION FILED JULY 3, 1905.
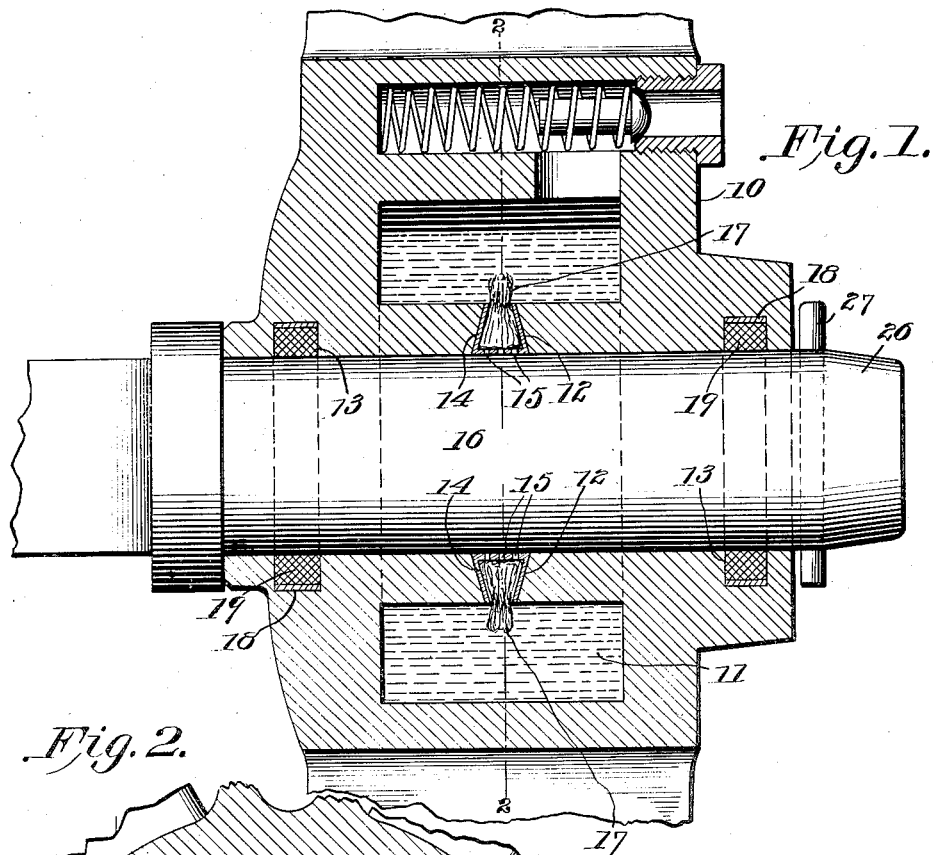
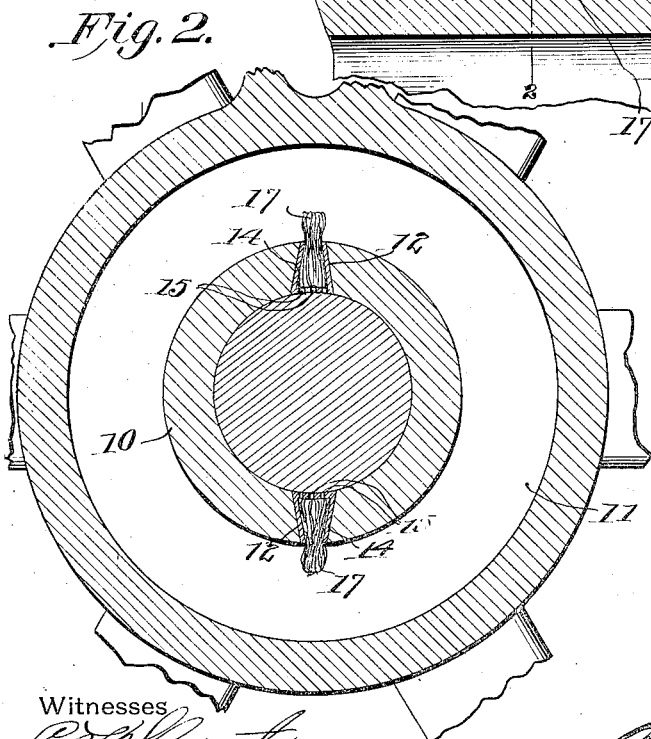
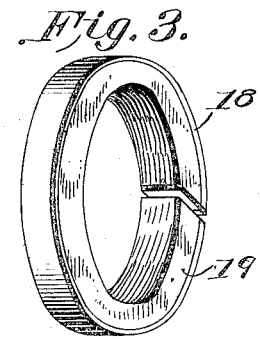
Witnesses
Otis Q. Sellers, Inventor.
by Attorneys

UNITED STATES PATENT OFFICE.

OTIS Q. SELLERS, OF WELLSTON, OHIO.

LUBRICATING-WHEEL.

No. 812,887.   Specification of Letters Patent.   Patented Feb. 20, 1906.

Application filed July 3, 1905. Serial No. 268,127.

*To all whom it may concern:*

Be it known that I, OTIS Q. SELLERS, a citizen of the United States, residing at Wellston, in the county of Jackson and State of Ohio, have invented a new and useful Lubricating-Wheel, of which the following is a specification.

This invention relates to wheels having means for automatically lubricating the axles upon which they rotate, and has for its object to improve the construction and increase the efficiency of devices of this character.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation.

Figure 1 is a sectional view of the hub portion of a wheel with the improved devices embodied therein. Fig. 2 is a section on the line 2 2 of Fig. 1. Fig. 3 is a perspective view of one of the resilient stop-rings detached.

The improved devices may be embodied in any of the various forms of wheels which have axle-openings and rotate upon their journals or axles, but is more particularly designed for use in connection with mining-car wheels and wheels employed upon similar vehicles and for the purpose of illustration is shown applied to the hub portion 10 of a wheel of this class.

A continuous oil chamber or reservoir 11 is formed around the hub substantially concentric with the axle-opening and with one or more apertures 12 between the reservoir and the interior of the hub, the apertures being preferably provided with the sides converging toward the reservoir.

Formed in the interior of the hub 10 are annular channels 13, spaced apart at opposite sides of the apertures 12 and preferably located near the ends of the hub.

Fitting within each of the apertures 12 is a casing 14 of sheet metal open toward the reservoir 11 and with the opposite end perforated, as at 15, the perforated ends curved to conform to the interior of the hub and of the axle-journal 16.

Disposed within each of the casings is a wick (represented at 17) with one end projecting through the open end of the casing and into the oil-reservoir.

Disposed within the channels 13 are divided rings 18 of resilient metal, such as steel, each ring being provided with a lining 19 of flexible material, such as felt, and placed in its corresponding channel in the hub before the axle is inserted.

Projecting from the outer face of the portion of the wheel forming the outer wall of the oil-reservoir is an inlet-chamber 20, communicating with the reservoir at 21 and with a threaded plug 22 in one end having a longitudinal aperture 23 and against whose inner end a valve 24 is seated and yieldably maintained in position by a spring 25.

When the reservoir is to be filled, the spout of an oil-can is inserted in the open end of the plug, which displaces the valve and permits the reservoir to be filled, and as soon as the spout is withdrawn the valve is automatically closed and prevents leakage of oil.

The axle 16 is slightly tapered at the outer end, as at 26, to facilitate its entrance into hub and to enable it to pass the protruding felt stop-rings 19 when being inserted. To assemble the parts, the casings 13, having the wicks 17 therein, are inserted through the axle-opening into the apertures 12 and the divided rings 18 19 "sprung" into the channels 13, the expansion of the members 18 holding the rings in position with the felt portions protruding into the interior of the hub for a short distance, as before stated. The journal 16 is then inserted, the tapered end 26 passing the felt members and compressing them into the channels, the journal also passing the casings 14 and compressing them into the inclined apertures 12. The holding-pin 27 or other fastening means is then applied to hold the wheel in position.

The wicks 17 absorb the oil and feed the same slowly to the journal or only so fast as the oil will be utilized to maintain the journal effectually lubricated, but with no surplus flow or waste.

The resiliency of the ring members 18 maintain the felt members pressed closely upon the journals in addition to the natural elasticity of the felt, so that none of the oil can pass beyond the hub and drip upon the wheels or track.

The device is simple in construction, effective in action, and can be inexpensively manufactured and applied to various forms of wheels.

Having thus described the invention, what is claimed is—

1. A hub having an axle-opening, an oil-reservoir adjacent to and communicating with the axle-opening by a dovetailed aperture, a closure for the aperture conforming to the interior of and proportioned to be inserted through the axle-opening, and a fibrous material filling the aperture between the closure and reservoir.

2. A hub having an axle-opening, an oil-reservoir adjacent to and communicating with the axle-opening, by a dovetailed aperture with its larger end opening into the axle-opening, a correspondingly-shaped casing adapted to engage the aperture and having a perforate end closing the opening and curved to form a continuation of the adjacent curved walls of the axle-opening, and a fibrous material filling the casing between the perforate closure and the reservoir.

3. A hub having an axle-opening, an oil-reservoir surrounding the axle-opening and substantially concentric therewith and with a tapered aperture connecting the axle-opening and reservoir with its larger end opening into the axle-opening, a casing proportioned to be inserted through the axle-opening into and to fit the aperture and having a perforate end closing the aperture and coinciding substantially with the interior curvature of the axle-opening, a wick engaged within the casing and having one end in contact with the perforate closure and the other end extending into the reservoir, a charging-chamber provided with a charging-opening and communicating with the reservoir, and a valve for the opening.

In testimony that I claim the foregoing as my own I have hereto affixed my signature in the presence of two witnesses.

OTIS Q. SELLERS.

Witnesses:
BARNEY SCHAVEL,
CHAS. DYE.